C. TRUESDALE.
Fire Place Lining.
No. 4,024. Reissued June 7, 1870.
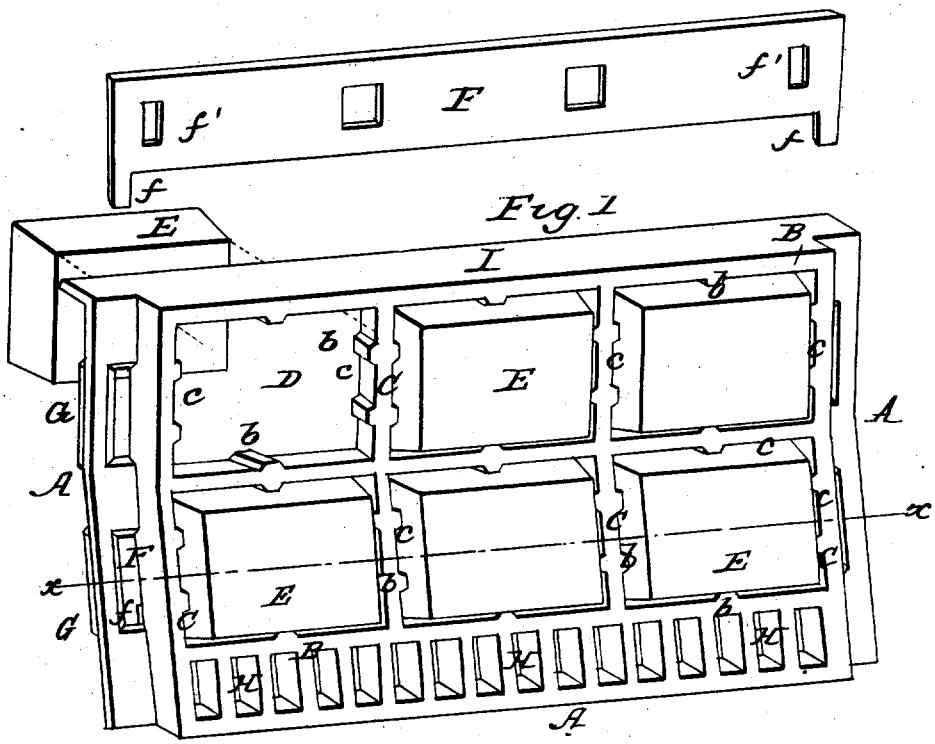
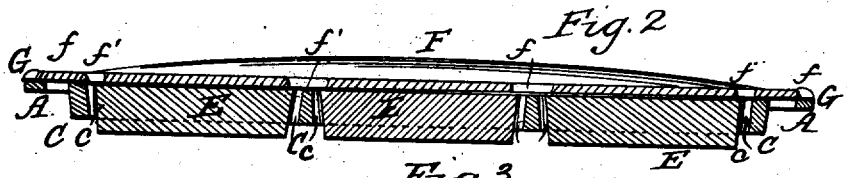
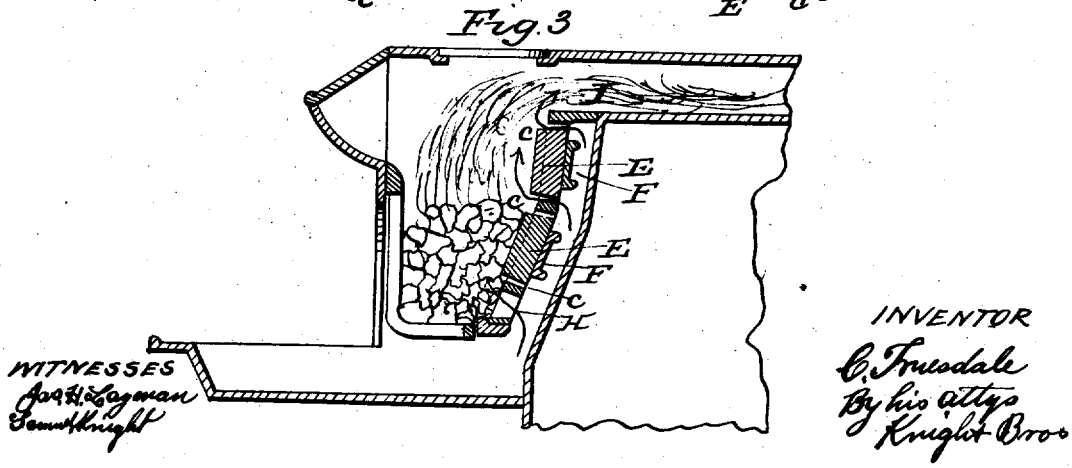
N. PETERS, Photo-Lithographer, Washington, D. C.

United States Patent Office.

CHARLES TRUESDALE AND WILLIAM RESOR & CO., OF CINCINNATI, OHIO, ASSIGNEES OF CHARLES TRUESDALE.

*Letters Patent No.* 91,689, *dated June* 22, 1869; *reissue No.* 4,024, *dated June* 7, 1870.

LINING FOR FIRE-PLACES.

The Schedule referred to in these Letters Patent and making part of the same.

CHARLES TRUESDALE, of Cincinnati, in the county of Hamilton and State of Ohio, invented a new and useful Lining for Fire-Places, of which the following is a specification.

*Nature and Objects of the Invention.*

The invention consists in forming the back or other lining-wall of a fire-place of one or more blocks or panels of soapstone or other refractory mineral, secured in a suitable metallic frame of such construction as to afford the necessary protection to the edges of the block or blocks, and to afford a ready means of adapting or fitting the same to the metallic surfaces of the stove; and said metallic frame may be of such construction as to afford air-inlets around or between the said block or blocks, the said air inlets serving both to protect the said frame from excessive heat, and to consume smoke.

Figure 1 is a perspective view of a fire-plate or lining embodying the invention, a binding-plate and one of the blocks being removed.

Figure 2 is a horizontal section of the said lining at the line *x x*.

Figure 3 is a vertical section, showing the lining as applied to a cook-stove.

The improvement, in its most complete form, comprises an open frame, A, of cast-iron, intersected by cross-bars B C, so as to present a series of openings, D, to receive blocks or panels E, of soapstone, fire-tile, or other refractory mineral.

The said bars and frame may flare rearward, as represented, to receive the correspondingly-flaring or dovetailed edges of the panels, and are also armed with protuberances *b*, so as to leave passages, *c*, for the entrance of numerous minute currents of air, which, having absorbed heat from and cooled the bars A B C, become effective to promote combustion and to prevent the generation of smoke.

The panels E are preferably made to project forward of the fire-place of the frame, so as to protect the latter from direct contact of the incandescent mass, and so as to afford channels for the entering air. The air, being permitted to pass in front of the panels, prevents thereby the formation of clinkers upon them.

The panels, being inserted, are held securely to their places by binders, F, whose dovetailed extremities, *f*, enter and wedge tightly within dovetailed lips or lugs, G, on the rear side of the frame.

The binders may have orifices, *f'*, to facilitate the passage of air.

The said frame may have, at its lower edge, a grating, H, for the admittance of draught to the rear bottom of the fire-place.

The top of the frame may have the usual flange, I, for resting against the oven-plate.

The binders are preferably stiffened with ribs or beads, as shown in figs. 2 and 3.

Small panels, as represented, can be furnished at a nominal cost, and are less liable to be cracked or broken than a single large block would be, and, should one receive an injury, it could be easily and cheaply replaced.

Although here shown adapted to the fire-back lining of a cook-stove, the principle may manifestly be extended to the ends or other walls of such a fire-place, or to those of heating-stoves or other furnaces.

*Claims.*

We claim as the invention of the said CHARLES TRUESDALE—

1. A lining for the fire-chamber of grates, stoves, &c., composed of a metallic frame adapted to fit the walls of said chamber, and inclosing one or more blocks of soapstone, fire-tile, or other refractory substance.

2. Such a lining, when removable, as set forth.

3. Providing the fire-chamber of a stove or grate with a lining consisting of a metallic frame, inclosing one or more blocks of soapstone, fire-tile, or other refractory substance, the same being provided with suitable air-inlets, as set forth.

4. The metallic frame A B C, having one or more openings D and protuberances *b*, when used in the described connection with removable block or blocks E, as and for the purpose set forth.

5. The combination, substantially as described, of the metallic frame A B C, one or more rearwardly-flaring openings D, protuberances *b*, tapering block or blocks E, and one or more binders F, or their equivalents, for the object stated.

6. Projecting the block or blocks E in front of the exposed face of the metallic frame A B C, as herein set forth.

In testimony of which invention we hereunto set our hands.

CHARLES TRUESDALE.
WM. RESOR.
JACOB RESOR.
WM. RESOR, JR.
J. B. RESOR.
CHARLES TRUESDALE.

Witnesses:
GEO. H. KNIGHT,
JAMES H. LAYMAN.